United States Patent
Tong

(10) Patent No.: US 10,877,990 B2
(45) Date of Patent: Dec. 29, 2020

(54) REMOTE DATABASE SYNCHRONIZATION

(71) Applicant: Advanced New Technologies Co., Ltd., George Town (KY)

(72) Inventor: Yin Tong, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 222 days.

(21) Appl. No.: 15/717,344

(22) Filed: Sep. 27, 2017

(65) Prior Publication Data

US 2018/0018381 A1 Jan. 18, 2018

Related U.S. Application Data

(63) Continuation of application No. PCT/CN2016/076410, filed on Mar. 15, 2016.

(30) Foreign Application Priority Data

Apr. 1, 2015 (CN) .......................... 2015 1 0152707

(51) Int. Cl.
*G06F 16/00* (2019.01)
*G06F 16/27* (2019.01)
*G06F 16/23* (2019.01)

(52) U.S. Cl.
CPC .......... *G06F 16/27* (2019.01); *G06F 16/2379* (2019.01); *G06F 16/273* (2019.01)

(58) Field of Classification Search
CPC .................................................... G06F 16/273
USPC ................................................ 707/620, 625
See application file for complete search history.

(56) References Cited

U.S. PATENT DOCUMENTS

| 2006/0190506 | A1 | 8/2006 | Rao et al. |
| 2008/0005189 | A1 | 1/2008 | Omura |
| 2008/0189340 | A1* | 8/2008 | Blea ........................ G06F 16/27 |
| 2014/0040197 | A1* | 2/2014 | Wijayaratne .......... G06F 16/178 707/625 |
| 2014/0188798 | A1* | 7/2014 | Mackenzie ........... G06F 16/182 707/625 |

FOREIGN PATENT DOCUMENTS

| CN | 1501271 | 6/2004 |
| CN | 101046761 | 10/2007 |
| CN | 101216832 | 7/2008 |

(Continued)

OTHER PUBLICATIONS

International Search Report of the International Searching Authority issued in International Application No. PCT/CN2016/076410 dated Jun. 14, 2016; 9 pages.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.

(Continued)

*Primary Examiner* — Chelcie L Daye
(74) *Attorney, Agent, or Firm* — Fish & Richardson P.C.

(57) ABSTRACT

Service data updated in a data update event is acquired by a service application executed by a computer-implemented system. The service data is stored in a local database of the service application. An event version corresponding to the data update event is generated by the service application. The service data and the event version are encapsulated into an event object by the service application. The event object is transmitted to a peer-end service application for synchronizing corresponding service data in a peer-end database of the peer-end service application.

20 Claims, 4 Drawing Sheets

(56) References Cited

FOREIGN PATENT DOCUMENTS

| | | |
|---|---|---|
| CN | 101551801 | 10/2009 |
| CN | 101582071 | 11/2009 |
| CN | 102098342 | 6/2011 |
| CN | 102945236 | 2/2013 |
| CN | 103595807 | 2/2014 |
| CN | 103620599 | 3/2014 |
| JP | 2001159985 | 6/2001 |
| JP | 2003514279 | 4/2003 |
| JP | 2003522344 | 7/2003 |
| JP | 2008009809 | 1/2008 |
| JP | 2008276553 | 11/2008 |
| JP | 2014106580 | 6/2014 |
| KR | 20060093672 | 7/2013 |
| WO | WO 2009147846 | 12/2009 |

OTHER PUBLICATIONS

Search Report and Written Opinion by the Intellectual Property Office of Singapore issued in Singapore Application No. 11201707774P dated May 17, 2018; 10 pages.

Extended European Search Report issued in EP Application No. 16771247.0 dated Aug. 17, 2018; 7 pages.

Kemme et al.; "Chapter 12: Database Replication: A Tutorial" In: "Replication. Lecture Notes in Computer Science" Feb. 1, 2010; pp. 219-252.

Yasushi Saito et al; "Optimistic Replication", ACM Computing Surveys, ACM, New York, NY, US; vol. 37, No, 1; Mar. 1, 2005; 40 pages.

Terry et al., "Managing update conflicts in Bayou, a weakly connected replicated storage system," Proceedings of the 15th ACM Symposium on Operating Systems Principles, 1995, 171-182.

* cited by examiner

REMOTE DATABASE SYNCHRONIZATION

REMOTE DATABASE SYNCHRONIZATION

This application is a continuation of PCT Application No. PCT/CN2016/076410, filed on Mar. 15, 2016, which claims priority to Chinese Patent Application No. 201510152707.9, filed on Apr. 1, 2015, the entire contents of each are hereby incorporated by reference.

BACKGROUND

Data synchronization between databases deployed at different locations is usually involved in database-related applications. In cases where two databases in need of data synchronization are located relatively far from one another, traditional database synchronization technologies can lead to higher synchronization delay and lower synchronization efficiency. For example, when the same object is changed by the two databases, high delay can cause data collision on the databases. Due to the data collisions, correct data modification can be denied by the databases, which further causes data inconsistency and low reliability.

SUMMARY

The present disclosure describes data synchronization between databases.

In an implementation, service data updated in a data update event is acquired by a service application executed by a computer-implemented system. The service data is stored in a local database of the service application. An event version corresponding to the data update event is generated by the service application. The service data and the event version are encapsulated into an event object by the service application. The event object is transmitted to a peer-end service application for synchronizing corresponding service data in a peer-end database of the peer-end service application.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method/the instructions stored on the non-transitory, computer-readable medium.

The subject matter described in this specification can be implemented in particular implementations, so as to realize one or more of the following advantages. First, the described subject matter can help achieve rapid and reliable data synchronization for databases. Second, the described subject matter can help ensure consistency of data between two remote databases, and reduce or avoid the chance of data collision. Third, the described subject matter can help enhance data transmission efficiency among remote databases. Fourth, only the final status or event version of a database is transferred to a peer-end database after multiple frequent data update events that occur within a short time duration. It is not necessary to transmit intermediate processes or database instructions. As a result, transmission traffic is reduced and effective utilization of network resources improved. Other advantages will be apparent to those of ordinary skill in the art.

The details of one or more implementations of the subject matter of this specification are set forth in the Detailed Description, the Claims, and the accompanying drawings. Other features, aspects, and advantages of the subject matter will become apparent from the Detailed Description, the Claims, and the accompanying drawings.

DESCRIPTION OF DRAWINGS

Like reference numbers and designations in the various drawings indicate like elements.

DETAILED DESCRIPTION

The following detailed description describes remote database synchronization, and is presented to enable any person skilled in the art to make and use the disclosed subject matter in the context of one or more particular implementations. Various modifications, alterations, and permutations of the disclosed implementations can be made and will be readily apparent to those or ordinary skill in the art, and the general principles defined can be applied to other implementations and applications, without departing from the scope of the present disclosure. In some instances, details unnecessary to obtain an understanding of the described subject matter can be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

Figure 1:
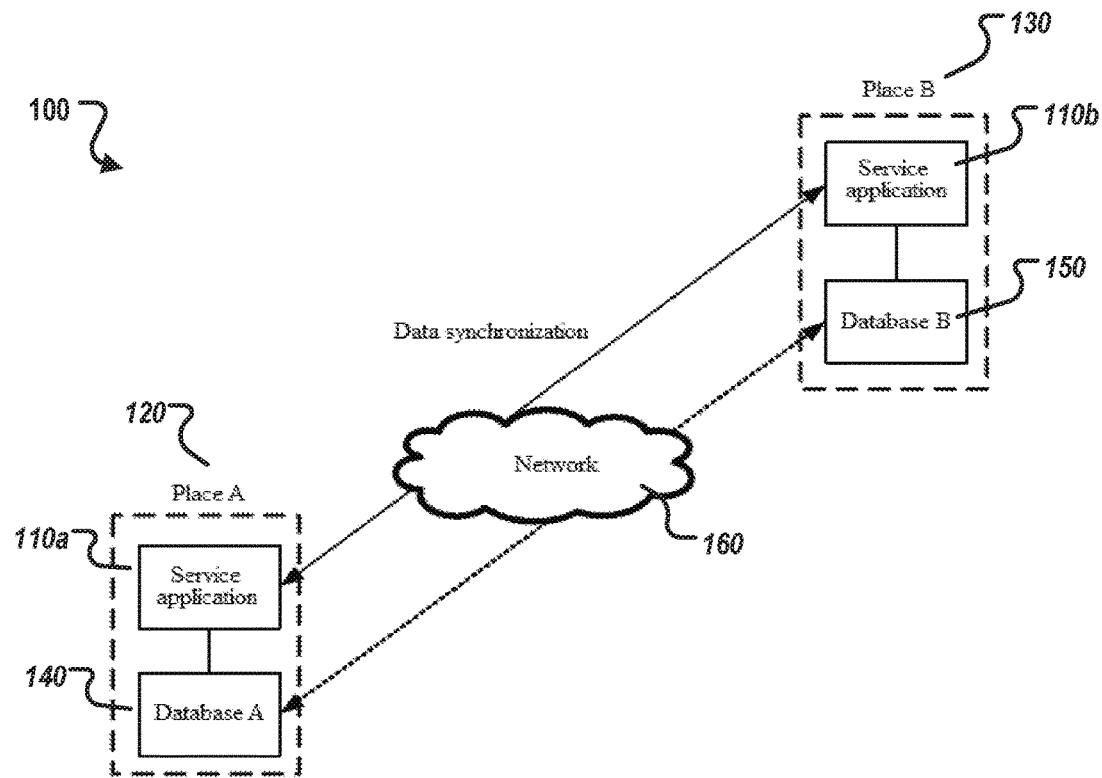
FIG. 1 is a block diagram illustrating an example system for remote database synchronization, according to an implementation of the present disclosure.

FIG. 1 is a block diagram illustrating an example system 100 for remote database synchronization, according to an implementation of the present disclosure. The example system 100 can include service applications 110*a* and 110*b* (collectively, 110) that are deployed at both Place A 120 and Place B 130. These two places, Place A 120 and Place B 130, can be remote from each other, such as in China and the United States or Hebei Province and Jiangsu Province. The service application 110 can be, for example, an application intended to acquire and store user information, for example, account, phone number, and other such user information of an ALIPAY™ user. The service application 110 can be, for example, executed by one or more computers that have installed hardware, firmware, and/or or software that when the software is executed by the one or more computers, functionalities of the service application 110 are achieved.

In some implementations, the user information of the service application 110 can be stored locally in respective databases. For example, user information (such as, user information derived from a user's registration on the website of ALIPAY™) acquired by the service application 110a is stored in Database A 140 at Place A 120, while user information acquired at Place B is stored in Database B 150 at Place B 130. In some implementations, based on service requirements, the user information acquired/stored at Place A 120 needs to be synchronized at Place B 130. Similarly, the user information acquired/stored at Place B 130 also needs to be synchronized at Place A 120. To ensure a consistency of the data of the Database A 140 and Database B 150 at these two places, remote data synchronization can be performed between Database A 140 and Database B 150 over a network 160, for example, according to example techniques disclosed in the present disclosure.

In some implementations, data synchronization processing is executed by databases as a database synchronization mechanism. For example, as denoted by as a dashed line in FIG. 1, the data synchronization processing can be performed directly by the Database A 140 and Database B 150. For example, whether data stored in the database is to be updated can be checked at regular, or other, intervals. If a determination is made that the data is to be updated, the data within a time interval is transmitted to a peer end for synchronization.

For the data transmission, take as an example updating a user name in one piece of user data. For example, a piece of user data can include one or more elements, and the user name is one element of the piece of user data. When the user name is changed in the database at one end, it is possible that multiple database instructions (for example, multiple SQL statements) are executed to realize the data update. At the time of synchronization with a peer end, these multiple database instructions likewise need to be transmitted to the peer end, and further need to be sent to the peer end in accordance with the order of their execution (for example, the next instruction is sent upon receipt of feedback from the peer end that one of these instructions has been successfully received). All of these factors can result in a relatively low rate of data transmission to the peer-end database. In some instances, the rate of data transmission can decrease dramatically with remote, long-distance data synchronization (such as, between China and the United States).

In some implementations, data synchronization processing is executed by the application layer (for example, service applications 110a and 110b in FIG. 1), as opposed to the database layer. The application layer can be divorced from numerous design constraints of the databases, which allows more freedom and flexibility to choose and optimize data synchronization mechanisms. For example, as denoted by as a solid line in FIG. 1, the data synchronization data synchronization is performed between the service applications 110a and 110b at Place A 120 and Place B 130. Once a data update occurs, a service application can send the updated data to the peer end in real-time (or in substantially real-time). As for the transmission, the service application can acquire information regarding the data update at a service level. The focus is on a result of the data update, rather than SQL statements at a more specific operational level. For example, after execution of multiple database instructions, a user name in one piece of user data is changed. Additionally, the service application can also acquire more information at the service level, for example, the piece of user data of which the changed user name is a part, and mark the time of occurrence of the data update event. The service application can consider a data update wholly as an event, and transmit a result of the data update event directly to the peer end once. In this way, the transmission can be more concise and rapid in some instances.

In some implementations of the disclosed data synchronization technique, the application layer can perform additional operations to improve the reliability of data synchronization for the database. For example, the service application layer can record time marks for data updates at the local end, and can determine an order of the data updates depending on the time marks. As such, the service application layer can select and update the latest data to the local database. In some instances, the disclosed data synchronization technique can help resolve the difficulty of a database determining an order of occurrence of data updates at two places, especially when the two places are simultaneously modifying data. In some instances, a database at a place can refuse performance of data updates because of network data collisions. In this situation, two computing devices (for example, databases at both remote places) attempt to transmit data packets simultaneously across the network. The network detects the collision of the data packets and discards them both. As a result, the database can received notice of the collisions and determine that the data update should not be performed.

Figure 2:
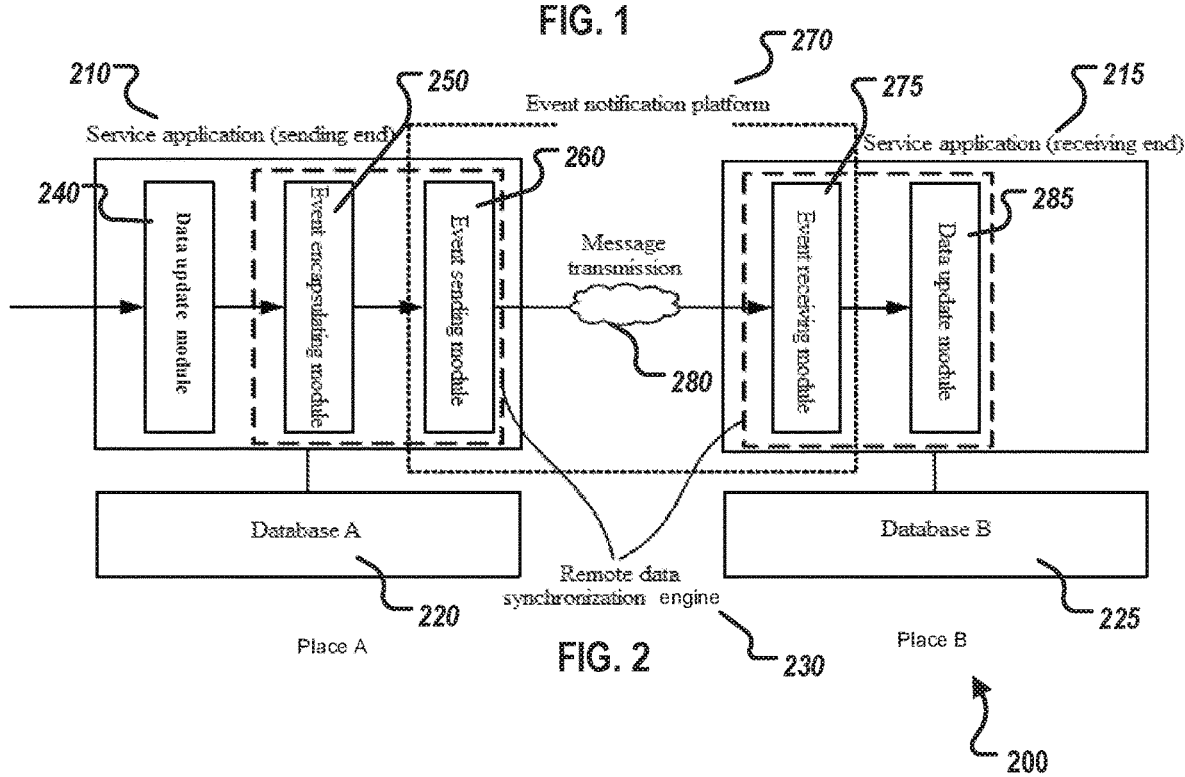
FIG. 2 is a block diagram illustrating an example system architecture for database synchronization, according to an implementation of the present disclosure.

FIG. 2 is a block diagram illustrating an example system architecture 200 for database synchronization, according to an implementation of the present disclosure. The example system architecture 200 can represent an example system architecture of the system 100 in FIG. 1 or another system for database synchronization. The example system architecture 200 includes a service application 210 communicatively linked to a local database, Database A 220, at Place A, and a service application 215 communicatively linked to a local database, Database B 225, at Place B. The service application 210 can represent the service application 110a at Place A 120 in FIG. 1. The service application 215 can represent the service application 110b at Place B 130. In the illustrated example, a data update occurs in Database A 220 at Place A and data needs to be synchronized from Place A to Place B. In the illustrated case, the service application 210 at Place A is utilized as a sending end for data synchronization, whereas the service application 215 at Place B is utilized as a receiving end for data synchronization.

The service application 210 utilized as the sending end includes a data update module 240, an event encapsulating module 250, and an event sending module 260. The service application 215 utilized as the receiving end includes an event receiving module 275 and a data update module 285. In some implementations, the service applications 210 and 215 can include additional or different components. Each of the modules can be implemented, for example, by software, hardware, firmware, or a combination of software, hardware, or firmware.

Figure 3:
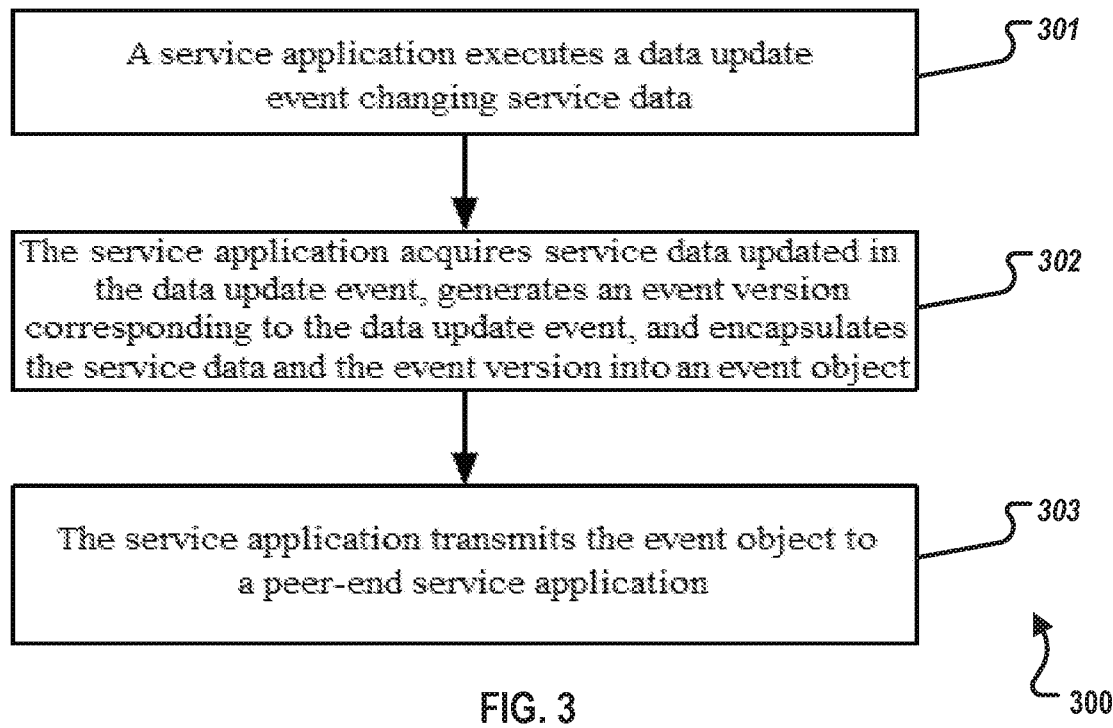
FIG. 3 is a flowchart illustrating an example database synchronization method, according to an implementation of the present disclosure.
Figure 5:
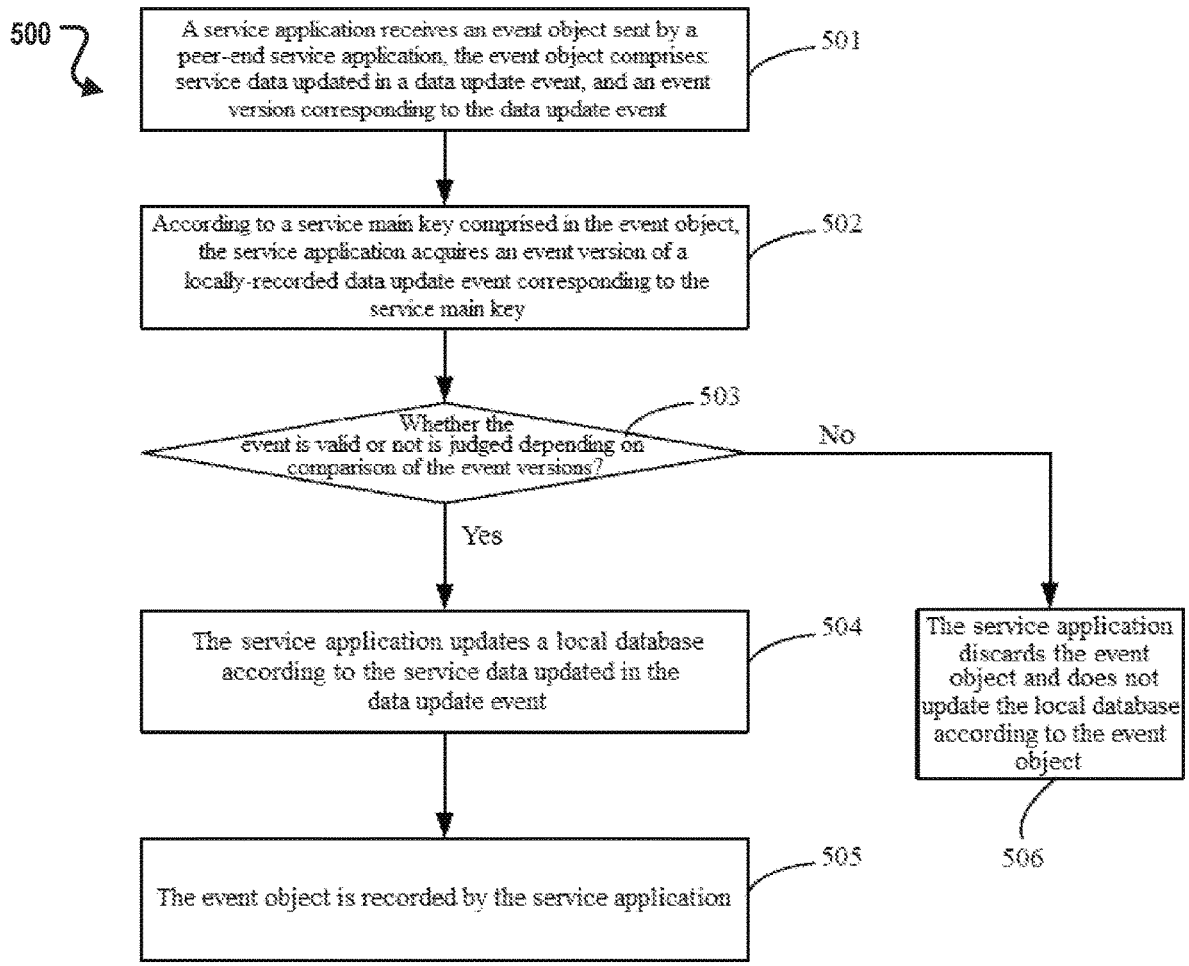
FIG. 5 is a flowchart illustrating an example database synchronization method, according to an implementation of the present disclosure.

In some implementations, the service applications 210 and 215 at the sending and receiving ends both include a remote data synchronization engine 230 for performing one or more operations of the remote database synchronization method (as described with respect to FIGS. 3 and 5. The remote data synchronization engine 230 at the sending end can include the event encapsulating module 250 and the event sending module 260. The remote data synchronization engine 230 at the receiving end can include the event receiving module 275 and the data update module 285.

In another example, where data is synchronized from Place B to Place A, the service application 215 at Place B can include components similar to the service application 210 at Place A as shown in FIG. 2, while the service application at Place A can include components similar to those of the service application 215 at Place B.

FIG. 3 is a flowchart illustrating an example database synchronization method 300, according to an implementation of the present disclosure. For clarity of presentation, the description that follows generally describes method 300 in the context of the other figures in this description. However, it will be understood that method 300 can be performed, for example, by any system, environment, software, and hardware, or a combination of systems, environments, software, and hardware, as appropriate. In some implementations, various steps of method 300 can be run in parallel, in combination, in loops, or in any order.

Method 300 describes an example processing procedure for data synchronization between Database A 220 and Database B 225 in the direction from Place A to Place B as illustrated in FIG. 2. A flow in the reverse direction can be performed similarly for data synchronization from Place B to Place A. The remote database synchronization method 300 can be performed by a service application executed by a computer-implemented system utilized as a sending end for the data synchronization.

At 301, a data update event is executed by a service application (for example, the service application 210 at Place A utilized as the sending end). In some implementations, the data update event is executed by the data update module 240 of the service application 210. The data update event changes service data stored at a local database (for example, Database A 220 at Place A) communicatively linked to the service application. As an example, the service application receives a request from a user using a software application to change the user's name from Jim to Tom. The service application can modify the database to reflect the user's request. In some implementations, the service application can complete the requested data change (for example, change of the user's name) by instructing the database using a database interface.

In some implementations, the service data stored in the database includes one or more data files, where each of one or more data files includes user information. In some implementations, each data file can include a service main key that is used for distinguishing different data files (for example, data files for different users).

In some implementations, elements of user information for a particular user can be stored in a particular table row. In these implementations, the table row containing the elements of user information can be considered to be a data storage unit. For example, a first data storage unit can be used to store information of User Y1, for example, User: {id=1, name=Jim}. The first data storage unit can also include additional information, such as phone number, email address, etc. For example, User: {id=1, name=Jim, phone=132****1112}. A second data storage unit can be used to store information of User Y2, for example, User: {id=2, name=Mary}. In this example, the id value in the user information can be used as a service main key for distinguishing different users/user information. In some implementations, the service main key can be omitted if information for only one user is present.

In this example, as the application service is used to store user information, the user information associated with a particular user is considered to be one piece of service data. In some implementations, a change in service data executed in a data update event may be directed to an element of data in one piece of service data. For example, only a user's name may be modified in the user information: User: {id=1, name=Jim, phone=132****1112}. From 301, method 300 proceeds to 302.

At 302, service data that has been updated in the data update event is acquired, for example, by the service application. An event version corresponding to the data update event is generated, and the service data and the event version is encapsulated into an event object. In response to the change in service data executed by the data update module of the service application (changing the name of the user from Jim to Tom), the service application also needs to acquire service data corresponding to the change (User: {id=1, name=Tom}). The service application also generates an event version that corresponds to the data update event corresponding to the additional service data. In some implementations, a data update event can include an operation that changes or updates the service data in the database, such as an addition, a deletion, and a modification. In some implementations, a data update event can include one or more operations that change or update the service data in the database. In some implementations, according to the order of occurrence of the events, an "event version" is recorded to represent the chronological order of the events. In some implementations, for example, the version value of the event that occurs for a first time may be "1", that is version=1, while the version value of the event that occurs for a second time can be incremented from the prior version value (for example, by a step value of 1 to version=2). As will be appreciated by those of ordinary skill in the art, event versions can be represented by any value, symbol, or designation (such as letters or time stamps), as long as it is possible to distinguish a chronological order of events.

In some implementations, the operations for acquiring the service data and generating event versions can be executed by an event encapsulating module associated with the service application (for example, the event encapsulating module 250 of the service application 210 as shown in FIG. 2). In some implementations, the event encapsulating module can encapsulate the service data and the event version into an event object. For instance, the encapsulated event object can be: Event: {user={id=1, name=Tom}, version=1}. In the situation where multiple pieces of user data are stored or otherwise included in the service application, the event object can include a service main key to indicate which user corresponds to the event object. From 302, method 300 proceeds to 303.

At 303, the event object is transmitted to a peer-end service application by the service application. In some implementations, the event object encapsulated by the service application can be sent by an event sending module (for example, an event sending module 260) to a peer-end service application (for example, a remote peer end that needs data synchronization).

The event object can be received by an event receiving module (for example, an event receiving module 275) of the peer-end service application (for example, the service application 215 utilized as the receiving end). In some implementations, the event sending module 260 at the sending end and the event receiving module 275 at the receiving end may be collectively referred to as an event notification platform 270, which serves to transmit the event object encapsulated by the service application 210. The transmission can be performed, for example, by message a transmission or other type of data communication, over the network 280.

In some implementations, real-time transmission can be achieved by transmitting the events through the event notification platform (for example, the event notification platform 270). For example, the service application 210, subsequent to data updates for the database, can perform a real-time encapsulation of an event object and transmit the event object to the peer end through the event notification platform 270. This can significantly improve synchronization efficiency compared to traditional database synchronization. In conventional database synchronization, a database is unable to appreciate a relationship or logic between or among data update events of the service application layer, meaning that the conventional database synchronization performs serial transmissions to ensure a strict order of data changes in the database. In the proposed database synchronization approach, the event notification platform does not need to be aware of a relationship or logic between or among data update events, meaning that a data update event can be sent directly when the data update event occurs. Idempotency and data correctness can be handled by a peer-end service application that receives an event object to ensure data correctness. The proposed database synchronization approach improves efficiency and timeliness of data transmissions.

In some implementations, the event notification platform can transmit information of one data update at a time to the peer end through an event object, which can increase the rate of data synchronization compared to the traditional mode where the database sequentially transmits multiple instructions in one data update. For example, in transactional data synchronization, the event notification platform has the capability to support transmission of one event to the peer end on the order of near milliseconds. After 303, method 300 stops.

Figure 4:
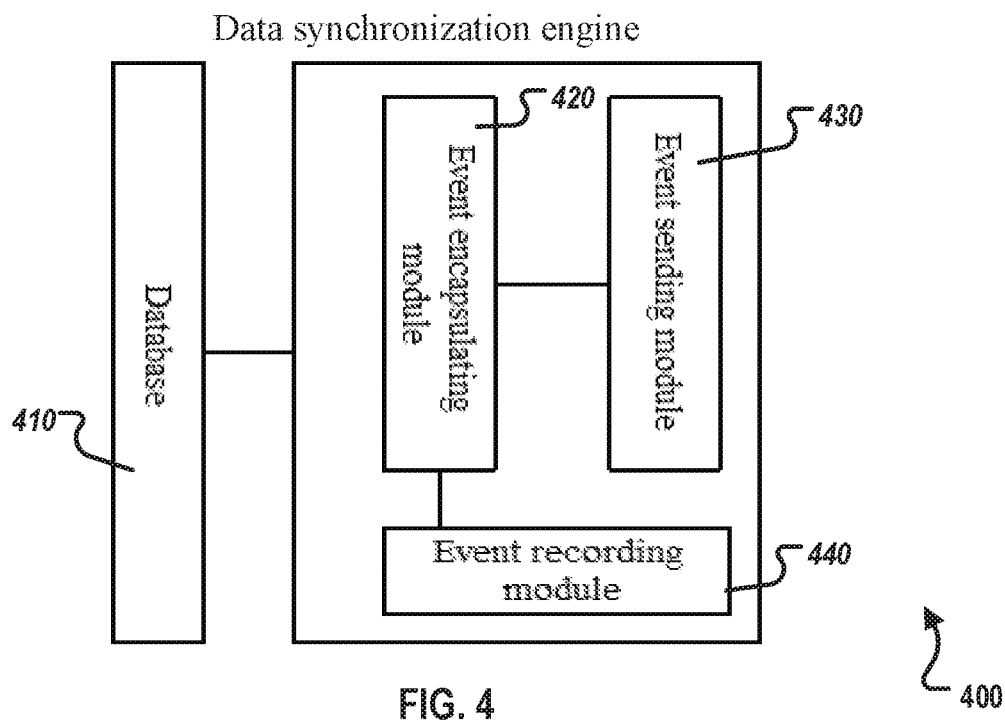
FIG. 4 is a block diagram illustrating an example data synchronization engine, according to an implementation of the present disclosure.

FIG. 4 is a block diagram illustrating an example data synchronization engine 400, according to an implementation of the present disclosure. The illustrated data synchronization engine 400 includes an event encapsulating module 420, an event sending module 430, and an event object recording module 440. The data synchronization engine 400 is communicatively linked to a local database 410 and can represent an example of a service application structure (for example, the service application 210 at a sending end). In some implementations, the data synchronization engine 400 can perform one or more operations of method 300.

In some implementations, after encapsulating the service data and the event version into an event object (for example, using event encapsulating module 420), the data synchronization engine 400 also records the event object by the event object recorder 440.

The event object recording module 440 can record event objects in the database 410. For example, event objects may be recorded, in the following manner:
Event: {user={id=1, name=Jim}, version=0}; and
Event: {user={id=1, name=Tom}, version=1}.

In some implementations, recording of event objects can be performed by the receiving end, upon receipt of an event object sent by the sending end. Recording of the event objects includes extracting information regarding an event version from the recorded event object and to determine event validity. In some implementations, recording some or all event objects facilitates better knowledge of the data change procedure and historical traceability.

In some implementations, after the event encapsulating module 420 finishes encapsulation of the event object, the event object recording module 440 can record the event objects before or after the event sending module 430 sends the event object.

FIG. 5 is a flowchart illustrating an example database synchronization method 500, according to an implementation of the present disclosure. For clarity of presentation, the description that follows generally describes method 500 in the context of the other figures in this description. However, it will be understood that method 500 can be performed, for example, by any system, environment, software, and hardware, or a combination of systems, environments, software, and hardware, as appropriate. In some implementations, various steps of method 500 can be run in parallel, in combination, in loops, or in any order.

Database synchronization method 500 describes an example processing procedure for data synchronization between Database A 220 and Database B 225 in the direction from Place A to Place B as shown in FIG. 2. A flow in the reverse direction can be performed similarly for data synchronization from Place B to Place A. method 500 can be performed by a service application executed by a computer-implemented system utilized as a receiving end for the data synchronization.

At 501, an event object sent by a peer-end service application (for example, the service application 210 at Place A) is received, for example, by a service application (for example, the service application 215 at Place B). The event object includes service data updated in a data update event, and an event version corresponding to the data update event.

For example, at the receiving end, the service application can receive, by an event receiving module, an event object sent by a peer end. The event object includes service data and event version, for example, the event object Event: {user={id=1, name=Tom}, version=1} as described in the previously-described example. When information of more than one user is stored in the database, the service data of the event object can include a service main key and data to be updated. The service main key is used to distinguish different user information. From 501, method 500 proceeds to 502.

At 502, according to the service main key included in the event object, an event version of a locally-recorded data update event corresponding to the service main key is acquired by the service application. For example, as shown in FIG. 2, the data update module 285 in the service application 215 may de-capsulate the event object and obtain the service main key and event version included in the event object, for example, in the previously-described event, the service main key, id=1, and the event version version=1.

As illustrated in FIG. 3, by the event recording module, the service application itself may record the event objects that have occurred. In the illustrated example, according to the service main key, id=1, in the received peer-end event object, the data update module 285 can acquire the event version of the locally-recorded data update event corresponding to the service main key, for example, by extracting information regarding the service main key and the event version, such as {id=1, version=0}, from the locally-recorded event record. If multiple event versions corresponding to the same id are locally recorded, then the event version of the event that occurs last (for example, based on the latest time or the largest version number) is acquired. From 502, method 500 proceeds to 503.

At 503, whether the received data update event is valid or not is determined by the service application, according to the event version. For example, the data update module 285 of the service application 215 may compare the locally-recorded event version with the event version of the received peer-end event corresponding to the same id. If the peer-end event occurs later in time, it can be determined that the peer-end event is valid, meaning that it is the latest data update event. If the peer-end event occurs earlier in time, then it can be determined that the latest data update event has been locally recorded and the peer-end event is invalid.

In some implementations, whether the data update event is valid can be determined based on a comparison of the numbers of the event versions. For example, if the event version version=1 of the peer-end event is larger than the event version version=0 of the local end, then it is determined that the data update event of the peer end is valid. The example method 500 proceeds from 502 to 504. Otherwise, if it is determined that the event version of the peer end is lower than the event version of the local end, and then the peer-end event is determined to be invalid. In other implementations, if the event versions are represented by time stamps, these time stamps are likewise compared with each other to determine the chronological order of occurrence of the events of the local end and the peer end. The example method 500 proceeds from 502 to 506.

At 504, a local database is updated by the service application according to the service data updated in the data update event. For example, after determining that the data update event of the peer end is valid, the service application 215 can call a database interface to change the corresponding service data in the Database 225. That is, the local service data is updated to user={id=1, name=Tom} according to user={id=1, name=Tom}. From 504, method 500 proceeds to 505.

At 505, the event object is recorded by the service application. For example, the service application 215, after updating the service data in the local database 225 according to the data update event of the peer end, also updates a locally-recorded event object according to this event. The service application 215 can record the latest event object Event: {user={id=1, name=Tom}, version=1} in the local database 225 through the event recording module, and save historical event records for purposes of tracing. In some implementations, the event object can be recorded either after it is determined that the event of the peer end is valid, or after the local database is updated. After 505, method 500 stops.

At 506, the event object is discarded by the service application. The service application does not update the local database according to the event object. After 506, method 500 stops.

As seen from this example, the service application identifies the order of occurrence of the various data update events using the event versions, which helps accurately identify the latest event and ensures accurate updates for the database. For example, the latest data update can be accurately identified by comparison of the event versions even though the two ends are on the verge of simultaneously changing the data of the same target.

The disclosed database synchronization method is an event-based data synchronization. The disclosed database synchronization method enables real-time transmission of information regarding data updates. The disclosed database synchronization method also allows relatively fast event transmission. Furthermore, the order of different data updates can also be distinguished through event versions, thereby helping guarantee the accuracy and reliability of data updates for the database.

Figure 6:
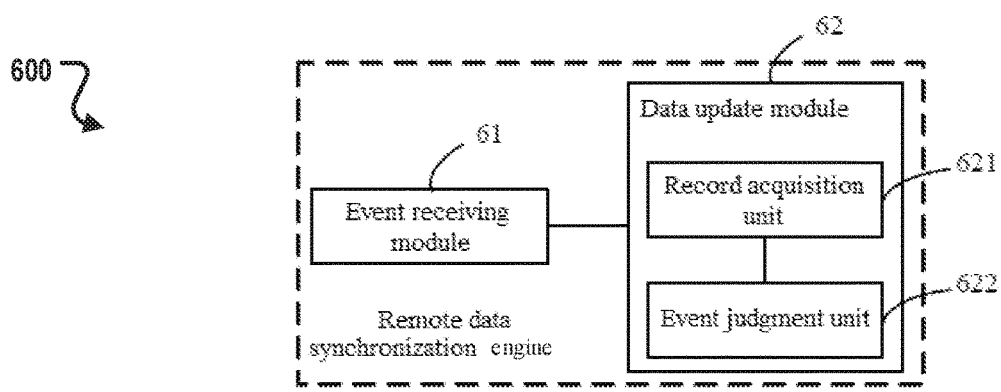
FIG. 6 is a block diagram illustrating an example data synchronization engine, according to an implementation of the present disclosure.

FIG. 6 is a block diagram illustrating an example data synchronization engine 600, according to an implementation of the present disclosure. The data synchronization engine 600 can represent a structure of a service application utilized as the receiving end (for example, the service application 215) for remote database synchronization. The example data synchronization engine 600 can perform one or more operations of the example database synchronization method 500.

The data synchronization engine 600 includes a data receiving module 61 and a data update module 62. In some implementations, the data update module 62 can include a record acquisition unit 621 and an event judgment unit 622. In some implementations, the record acquisition unit 621 is configured to acquire, according to a service main key included in the event object, an event version of a locally-recorded data update event corresponding to the service main key. As previously described, the service main key is used for distinguishing different service data, (for example, different service data belonging to different users). In some implementations, the event judgment unit 622 is configured to compare the local event version with a peer-end event version, and determine that the peer-end data update event chronologically occurs after the locally-recorded data update event.

Figure 7:
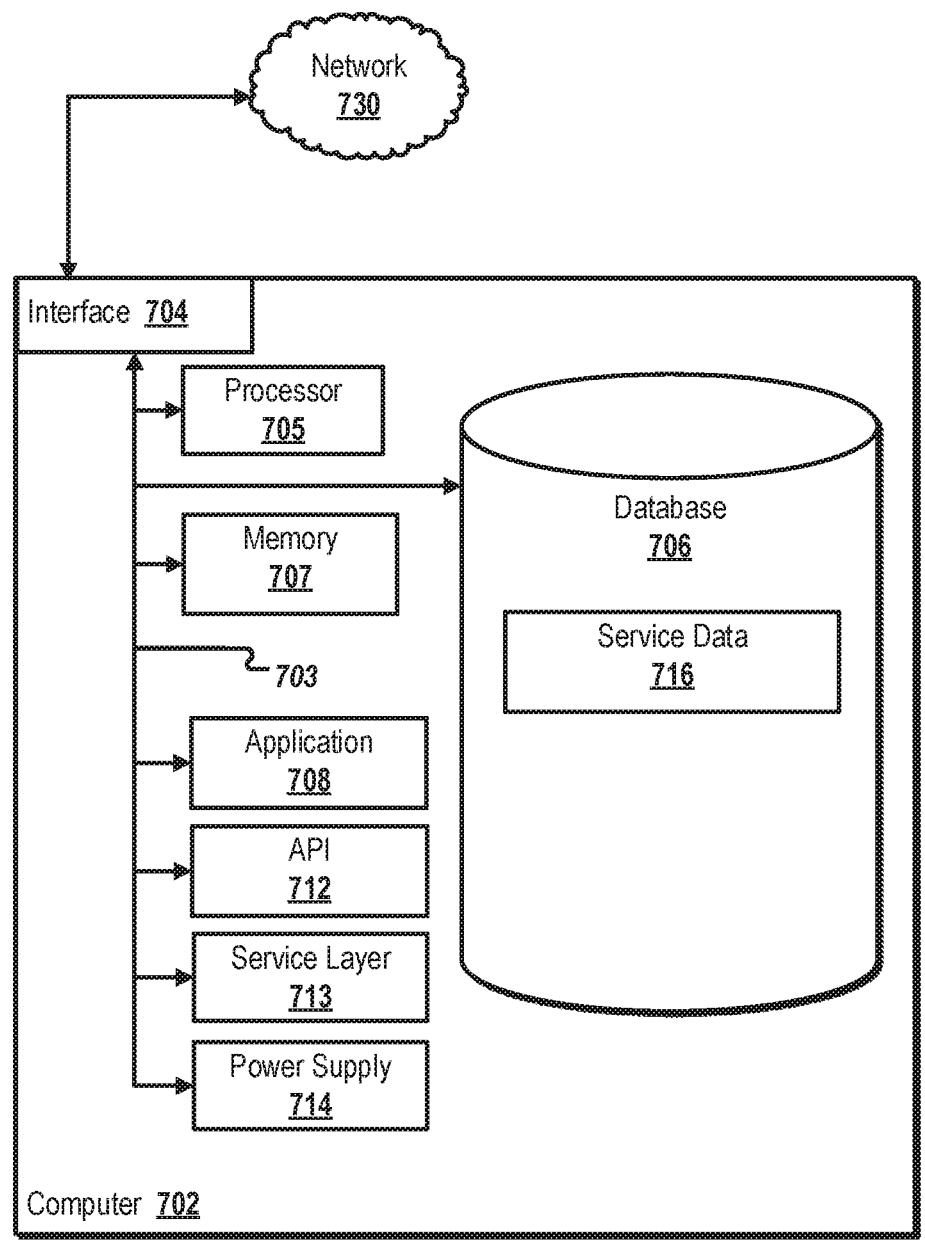
FIG. 7 is a block diagram illustrating an example computer system used to provide computational functionalities associated with described algorithms, methods, functions, processes, flows, and procedures as described in the present disclosure, according to an implementation of the present disclosure.

FIG. 7 is a block diagram of an example computer system 700 used to provide computational functionalities associated with described algorithms, methods, functions, processes, flows, and procedures, according to an implementation of the present disclosure. The illustrated computer 702 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 702 can include a computer that includes an input device, such as a keypad, keyboard, touch screen, another input device, or a combination of input devices that can accept user information, and an output device that conveys information associated with the operation of the computer 702, including digital data, visual, audio, another type of information, or a combination of types of information, on a graphical-type user interface (UI) (or GUI) or other UI.

The computer 702 can serve in a role in a computer system as a client, network component, a server, a database or another persistency, another role, or a combination of roles for performing the subject matter described in the present disclosure. The illustrated computer 702 is communicably coupled with a network 730. In some implementations, one or more components of the computer 702 can be configured to operate within an environment, including cloud-computing-based, local, global, another environment, or a combination of environments.

At a high level, the computer 702 is an electronic computing device operable to receive, transmit, process, store, or manage data and information associated with the described subject matter. According to some implementations, the computer 702 can also include or be communicably coupled with a server, including an application server, e-mail server, web server, caching server, streaming data server, another server, or a combination of servers.

The computer 702 can receive requests over network 730 (for example, from a client software application executing on another computer 702) and respond to the received requests by processing the received requests using a software application or a combination of software applications. In addition, requests can also be sent to the computer 702 from internal users (for example, from a command console or by another internal access method), external or third-parties, or other entities, individuals, systems, or computers.

Each of the components of the computer 702 can communicate using a system bus 703. In some implementations, any or all of the components of the computer 702, including hardware, software, or a combination of hardware and software, can interface over the system bus 703 using an application programming interface (API) 712, a service layer 713, or a combination of the API 712 and service layer 713. The API 712 can include specifications for routines, data structures, and object classes. The API 712 can be either computer-language independent or dependent and refer to a complete interface, a single function, or even a set of APIs. The service layer 713 provides software services to the computer 702 or other components (whether illustrated or not) that are communicably coupled to the computer 702. The functionality of the computer 702 can be accessible for all service consumers using this service layer. Software services, such as those provided by the service layer 713, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 702, alternative implementations can illustrate the API 712 or the service layer 713 as stand-alone components in relation to other components of the computer 702 or other components (whether illustrated or not) that are communicably coupled to the computer 702. Moreover, any or all parts of the API 712 or the service layer 713 can be implemented as a child or a sub-module of another software module, enterprise application, or hardware module without departing from the scope of the present disclosure.

The computer 702 includes an interface 704. Although illustrated as a single interface 704 in FIG. 7, two or more interfaces 704 can be used according to particular needs, desires, or particular implementations of the computer 702. The interface 704 is used by the computer 702 for communicating with another computing system (whether illustrated or not) that is communicatively linked to the network 730 in a distributed environment. Generally, the interface 704 is operable to communicate with the network 730 and includes logic encoded in software, hardware, or a combination of software and hardware. More specifically, the interface 704 can include software supporting one or more communication protocols associated with communications such that the network 730 or interface's hardware is operable to communicate physical signals within and outside of the illustrated computer 702.

The computer 702 includes a processor 705. Although illustrated as a single processor 705 in FIG. 7, two or more processors can be used according to particular needs, desires, or particular implementations of the computer 702. Generally, the processor 705 executes instructions and manipulates data to perform the operations of the computer 702 and any algorithms, methods, functions, processes, flows, and procedures as described in the present disclosure.

The computer 702 also includes a database 706 that can hold data for the computer 702, another component communicatively linked to the network 730 (whether illustrated or not), or a combination of the computer 702 and another component. For example, database 706 can be an in-memory, conventional, or another type of database storing data consistent with the present disclosure. In some implementations, database 706 can be a combination of two or more different database types (for example, a hybrid in-memory and conventional database) according to particular needs, desires, or particular implementations of the computer 702 and the described functionality. Although illustrated as a single database 706 in FIG. 7, two or more databases of similar or differing types can be used according to particular needs, desires, or particular implementations of the computer 702 and the described functionality. While database 706 is illustrated as an integral component of the computer 702, in alternative implementations, database 706 can be external to the computer 702. As illustrated, the database 706 holds previously described service data 716 such as user information of a service application.

The computer 702 also includes a memory 707 that can hold data for the computer 702, another component or components communicatively linked to the network 730 (whether illustrated or not), or a combination of the computer 702 and another component. Memory 707 can store any data consistent with the present disclosure. In some implementations, memory 707 can be a combination of two or more different types of memory (for example, a combination of semiconductor and magnetic storage) according to particular needs, desires, or particular implementations of the computer 702 and the described functionality. Although illustrated as a single memory 707 in FIG. 7, two or more memories 707 or similar or differing types can be used according to particular needs, desires, or particular implementations of the computer 702 and the described functionality. While memory 707 is illustrated as an integral component of the computer 702, in alternative implementations, memory 707 can be external to the computer 702.

The application 708 is an algorithmic software engine providing functionality according to particular needs, desires, or particular implementations of the computer 702, particularly with respect to functionality described in the present disclosure. For example, application 708 can serve as one or more components, modules, or applications. Further, although illustrated as a single application 708, the application 708 can be implemented as multiple applications 708 on the computer 702. In addition, although illustrated as integral to the computer 702, in alternative implementations, the application 708 can be external to the computer 702.

The computer 702 can also include a power supply 714. The power supply 714 can include a rechargeable or non-rechargeable battery that can be configured to be either user- or non-user-replaceable. In some implementations, the power supply 714 can include power-conversion or management circuits (including recharging, standby, or another power management functionality). In some implementations, the power-supply 714 can include a power plug to allow the computer 702 to be plugged into a wall socket or another power source to, for example, power the computer 702 or recharge a rechargeable battery.

There can be any number of computers 702 associated with, or external to, a computer system containing computer 702, each computer 702 communicating over network 730. Further, the term "client," "user," or other appropriate terminology can be used interchangeably, as appropriate, without departing from the scope of the present disclosure. Moreover, the present disclosure contemplates that many users can use one computer 702, or that one user can use multiple computers 702.

Described implementations of the subject matter can include one or more features, alone or in combination.

For example, in a first implementation, a computer-implemented method, comprising: acquiring, by a service application executed by a computer-implemented system, service data updated in a data update event, the service data stored in a local database of the service application; generating, by the service application, an event version corresponding to the data update event; encapsulating, by the service application, the service data and the event version into an event object; and transmitting, by the service application, the event object to a peer-end service application for synchronizing corresponding service data in a peer-end database of the peer-end service application.

The foregoing and other described implementations can each, optionally, include one or more of the following features:

A first feature, combinable with any of the following features, wherein the event object comprises a service main key that distinguishes different service data.

A second feature, combinable with any of the previous or following features, further comprising, after encapsulating the service data and the event version into an event object, recording the event object.

In a second implementation, a computer-implemented method, comprising: receiving, by a service application executed by a computer-implemented system, an event object sent by a peer-end service application, the event object including service data updated in a data update event; and an event version corresponding to the data update event; and updating, by the service application, a local database according to the service data updated in the data update event when determining according to the event version that the peer-end data update event is valid.

The foregoing and other described implementations can each, optionally, include one or more of the following features:

A first feature, combinable with any of the following features, wherein determining according to the event version that the peer-end data update event is valid further comprises determining according to the event version that the peer-end data update event chronologically occurs after a locally-recorded data update event.

A second feature, combinable with any of the previous or following features, wherein determining according to the event version that the peer-end data update event chronologically occurs after a locally-recorded data update event further comprises: acquiring, according to a service main key included in the event object, an event version of the locally-recorded data update event corresponding to the service main key, the service main key being used for distinguishing different service data; and comparing the local event version with a peer-end event version, and determining that the peer-end data update event chronologically occurs after the locally-recorded data update event.

A third feature, combinable with any of the previous or following features, further comprising, after determining according to the event version that the peer-end data update event is valid, recording the event object.

In a third implementation, a computer-implemented system, comprising: one or more computers; and one or more computer memory devices interoperably coupled with the one or more computers and having tangible, non-transitory, machine-readable media storing instructions, that when executed by the one or more computers, perform operations comprising: acquiring, by a service application executed by the one or more computers, service data updated in a data update event, the service data stored in a local database of the service application; generating, by the service application, an event version corresponding to the data update event; encapsulating, by the service application, the service data and the event version into an event object; and transmitting, by the service application, the event object to a peer-end service application for synchronizing corresponding service data in a peer-end database of the peer-end service application.

The foregoing and other described implementations can each, optionally, include one or more of the following features:

A first feature, combinable with any of the following features, wherein the event object comprises a service main key that distinguishes different service data.

A second feature, combinable with any of the previous or following features, wherein the operations further comprise, after encapsulating the service data and the event version into an event object, recording the event object.

In a fourth implementation, a computer-implemented system, comprising: one or more computers; and one or more computer memory devices interoperably coupled with the one or more computers and having tangible, non-transitory, machine-readable media storing instructions, that when executed by the one or more computers, perform operations comprising: receiving, by a service application executed by the one or more computers, an event object sent by a peer-end service application, the event object including service data updated in a data update event; and an event version corresponding to the data update event; and updating, by the service application, a local database according to the service data updated in the data update event when determining according to the event version that the peer-end data update event is valid.

The foregoing and other described implementations can each, optionally, include one or more of the following features:

A first feature, combinable with any of the following features, wherein determining according to the event version that the peer-end data update event is valid further comprises determining according to the event version that the peer-end data update event chronologically occurs after a locally-recorded data update event.

A second feature, combinable with any of the previous or following features, wherein determining according to the event version that the peer-end data update event chronologically occurs after a locally-recorded data update event further comprises: acquiring, according to a service main key included in the event object, an event version of the locally-recorded data update event corresponding to the service main key, the service main key being used for distinguishing different service data; and comparing the local event version with a peer-end event version, and determining that the peer-end data update event chronologically occurs after the locally-recorded data update event.

A third feature, combinable with any of the previous or following features, wherein the operations further comprise, after determining according to the event version that the peer-end data update event is valid, recording the event object.

In a fifth implementation, a non-transitory, computer-readable medium storing one or more instructions executable by a computer-implemented system to perform operations comprising: acquiring, by a service application executed by the computer-implemented system, service data updated in a data update event, the service data stored in a local database of the service application; generating, by the service application, an event version corresponding to the data update event; encapsulating, by the service application, the service data and the event version into an event object; and transmitting, by the service application, the event object to a peer-end service application for synchronizing corresponding service data in a peer-end database of the peer-end service application.

The foregoing and other described implementations can each, optionally, include one or more of the following features:

A first feature, combinable with any of the following features, wherein the event object further comprises a service main key that distinguishes different service data.

A second feature, combinable with any of the previous or following features, wherein the operations further comprise, after encapsulating the service data and the event version into an event object, recording the event object.

In a sixth implementation, a non-transitory, computer-readable medium storing one or more instructions executable by a computer-implemented system to perform operations comprising: receiving, by a service application executed by the computer-implemented system, an event object sent by a peer-end service application, the event object including service data updated in a data update event; and an event version corresponding to the data update event; and updating, by the service application, a local database according to the service data updated in the data update event when determining according to the event version that the peer-end data update event is valid.

The foregoing and other described implementations can each, optionally, include one or more of the following features:

A first feature, combinable with any of the following features, wherein determining according to the event version that the peer-end data update event is valid further comprises determining according to the event version that the peer-end data update event chronologically occurs after a locally-recorded data update event.

A second feature, combinable with any of the previous or following features, wherein determining according to the event version that the peer-end data update event chronologically occurs after a locally-recorded data update event further comprises: acquiring, according to a service main key included in the event object, an event version of the locally-recorded data update event corresponding to the service main key, the service main key being used for distinguishing different service data; and comparing the local event version with a peer-end event version, and determining that the peer-end data update event chronologically occurs after the locally-recorded data update event.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or another unit for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual modules that implement described features and functionality using various objects, methods, or other processes, the programs can instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital video disc (DVD), CD-ROM, DVD+/-R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what can be claimed, but rather as descriptions of features that can be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   instructing, by a service application executed by a computer-implemented system, a local database of the service application to perform one or more database operations corresponding to a data update event to update service data stored in the local database;
   determining, by the service application, that the one or more database operations are completed;
   acquiring, by the service application, the service data updated by the one or more database operations in the data update event;
   generating, by the service application, an event version corresponding to the data update event;
   encapsulating, by the service application, the service data and the event version into an event object; and
   transmitting, by the service application, the event object to a peer-end service application for synchronizing corresponding service data in a peer-end database of the peer-end service application;
   receiving, by the service application and from the peer-end service application, an additional event object, wherein the additional event object comprises a service main key and an additional event version;
   identifying, by the service application, a plurality of locally-recorded data update events associated with the service main key;
   identifying, by the service application and based on a plurality of event versions associated with the plurality of locally-recorded data update events, a particular locally-recorded data update event among the plurality of locally-recorded data update events, wherein the particular locally-recorded data update event is associated with a particular event version and occurs the latest among the plurality of locally-recorded data update events chronologically; and
   determining, by the service application and based on comparing the additional event version with the particular event version, that an additional data update event associated with the additional event object is valid.

2. The computer-implemented method of claim 1, wherein the event object comprises a service main key that distinguishes different service data.

3. The computer-implemented method of claim 1, further comprising, after encapsulating the service data and the event version into an event object, recording the event object.

4. A computer-implemented method, comprising:
   receiving, by a service application executed by a computer-implemented system, an event object sent by a peer-end service application, the event object comprising:
      service data updated in a peer-end data update event;
      an event version corresponding to the peer-end data update event; and
      a service main key;
   identifying, by the service application, a plurality of locally-recorded data update events associated with the service main key;
   identifying, by the service application and based on a plurality of event versions associated with the plurality of locally-recorded data update events, a particular locally-recorded data update event among the plurality of locally-recorded data update events, wherein the particular locally-recorded data update event is associated with a particular event version and occurs the latest among the plurality of locally-recorded data update events chronologically;
   determining, by the service application and based on comparing the event version with the particular event version, that the peer-end data update event is valid;
   determining, by the service application, one or more database operations corresponding to the service data updated in the peer-end data update event; and
   instructing, by the service application, a local database of the service application to perform the one or more database operations to update service data stored in the local database.

5. The method according to claim 4, wherein determining according to the event version that the peer-end data update event is valid further comprises determining according to the event version that the peer-end data update event chronologically occurs after a locally-recorded data update event.

6. The method according to claim 5, wherein determining according to the event version that the peer-end data update event chronologically occurs after a locally-recorded data update event further comprises:
    acquiring, according to the service main key comprised in the event object, an event version of the locally-recorded data update event corresponding to the service main key, the service main key being used for distinguishing different service data; and
    comparing the event version of the locally-recorded data update event with the event version corresponding to the peer-end data update event, and determining that the peer-end data update event chronologically occurs after the locally-recorded data update event.

7. The method according to claim 4, further comprising, after determining according to the event version that the peer-end data update event is valid, recording the event object.

8. A computer-implemented system, comprising:
    one or more computers; and
    one or more computer memory devices interoperably coupled with the one or more computers and having tangible, non-transitory, machine-readable media storing instructions, that when executed by the one or more computers, perform operations comprising:
        instructing, by a service application executed by a computer-implemented system, a local database of the service application to perform one or more database operations corresponding to a data update event to update service data stored in the local database;
        determining, by the service application, that the one or more database operations are completed;
        acquiring, by the service application, the service data updated by the one or more database operations in the data update event;
        generating, by the service application, an event version corresponding to the data update event;
        encapsulating, by the service application, the service data and the event version into an event object; and
        transmitting, by the service application, the event object to a peer-end service application for synchronizing corresponding service data in a peer-end database of the peer-end service application;
        receiving, by the service application and from the peer-end service application, an additional event object, wherein the additional event object comprises a service main key and an additional event version;
        identifying, by the service application, a plurality of locally-recorded data update events associated with the service main key;
        identifying, by the service application and based on a plurality of event versions associated with the plurality of locally-recorded data update events, a particular locally-recorded data update event among the plurality of locally-recorded data update events, wherein the particular locally-recorded data update event is associated with a particular event version and occurs the latest among the plurality of locally-recorded data update events chronologically; and
        determining, by the service application and based on comparing the additional event version with the particular event version, that an additional data update event associated with the additional event object is valid.

9. The computer-implemented system of claim 8, wherein the event object comprises a service main key that distinguishes different service data.

10. The computer-implemented system of claim 8, wherein the operations further comprise, after encapsulating the service data and the event version into an event object, recording the event object.

11. A computer-implemented system, comprising:
    one or more computers; and
    one or more computer memory devices interoperably coupled with the one or more computers and having tangible, non-transitory, machine-readable media storing instructions, that when executed by the one or more computers, perform operations comprising:
        receiving, by a service application executed by the one or more computers, an event object sent by a peer-end service application, the event object comprising:
            service data updated in a peer-end data update event;
            an event version corresponding to the peer-end data update event; and
            a service main key;
        identifying, by the service application, a plurality of locally-recorded data update events associated with the service main key;
        identifying, by the service application and based on a plurality of event versions associated with the plurality of locally-recorded data update events, a particular locally-recorded data update event among the plurality of locally-recorded data update events, wherein the particular locally-recorded data update event is associated with a particular event version and occurs the latest among the plurality of locally-recorded data update events chronologically;
        determining, by the service application and based on comparing the event version with the particular event version, that the peer-end data update event is valid;
        determining, by the service application, one or more database operations corresponding to the service data updated in the peer-end data update event; and
        instructing, by the service application, a local database of the service application to perform the one or more database operations to update service data stored in the local database.

12. The computer-implemented system of claim 11, wherein determining according to the event version that the peer-end data update event is valid further comprises determining according to the event version that the peer-end data update event chronologically occurs after a locally-recorded data update event.

13. The computer-implemented system of claim 12, wherein determining according to the event version that the peer-end data update event chronologically occurs after a locally-recorded data update event further comprises:
    acquiring, according to the service main key comprised in the event object, an event version of the locally-recorded data update event corresponding to the service main key, the service main key being used for distinguishing different service data; and
    comparing the event version of the locally-recorded data update event with the event version corresponding to the peer-end data update event, and determining that the peer-end data update event chronologically occurs after the locally-recorded data update event.

14. The computer-implemented system of claim 11, wherein the operations further comprise, after determining according to the event version that the peer-end data update event is valid, recording the event object.

15. A non-transitory, computer-readable medium storing one or more instructions executable by a computer-implemented system to perform operations comprising:
- instructing, by a service application executed by a computer-implemented system, a local database of the service application to perform one or more database operations corresponding to a data update event to update service data stored in the local database;
- determining, by the service application, that the one or more database operations are completed;
- acquiring, by the service application, the service data updated by the one or more database operations in the data update event;
- generating, by the service application, an event version corresponding to the data update event;
- encapsulating, by the service application, the service data and the event version into an event object; and
- transmitting, by the service application, the event object to a peer-end service application for synchronizing corresponding service data in a peer-end database of the peer-end service application;
- receiving, by the service application and from the peer-end service application, an additional event object, wherein the additional event object comprises a service main key and an additional event version;
- identifying, by the service application, a plurality of locally-recorded data update events associated with the service main key;
- identifying, by the service application and based on a plurality of event versions associated with the plurality of locally-recorded data update events, a particular locally-recorded data update event among the plurality of locally-recorded data update events, wherein the particular locally-recorded data update event is associated with a particular event version and occurs the latest among the plurality of locally-recorded data update events chronologically; and
- determining, by the service application and based on comparing the additional event version with the particular event version, that an additional data update event associated with the additional event object is valid.

16. The non-transitory, computer-readable medium of claim 15, wherein the event object further comprises a service main key that distinguishes different service data.

17. The non-transitory, computer-readable medium of claim 15, wherein the operations further comprise, after encapsulating the service data and the event version into an event object, recording the event object.

18. A non-transitory, computer-readable medium storing one or more instructions executable by a computer-implemented system to perform operations comprising:
- receiving, by a service application executed by the computer-implemented system, an event object sent by a peer-end service application, the event object comprising:
  - service data updated in a peer-end data update event;
  - an event version corresponding to the peer-end data update event; and
  - a service main key;
- identifying, by the service application, a plurality of locally-recorded data update events associated with the service main key;
- identifying, by the service application and based on a plurality of event versions associated with the plurality of locally-recorded data update events, a particular locally-recorded data update event among the plurality of locally-recorded data update events, wherein the particular locally-recorded data update event is associated with a particular event version and occurs the latest among the plurality of locally-recorded data update events chronologically;
- determining, by the service application and based on comparing the event version with the particular event version, that the peer-end data update event is valid;
- determining, by the service application, one or more database operations corresponding to the service data updated in the peer-end data update event; and
- instructing, by the service application, a local database of the service application to perform the one or more database operations to update service data stored in the local database.

19. The non-transitory, computer-readable medium of claim 18, wherein determining according to the event version that the peer-end data update event is valid further comprises determining according to the event version that the peer-end data update event chronologically occurs after a locally-recorded data update event.

20. The non-transitory, computer-readable medium of claim 18, wherein determining according to the event version that the peer-end data update event chronologically occurs after a locally-recorded data update event further comprises:
- acquiring, according to the service main key comprised in the event object, an event version of the locally-recorded data update event corresponding to the service main key, the service main key being used for distinguishing different service data; and
- comparing the event version of the locally-recorded data update event with the event version corresponding to the peer-end data update event, and determining that the peer-end data update event chronologically occurs after the locally-recorded data update event.

* * * * *

UNITED STATES PATENT AND TRADEMARK OFFICE
CERTIFICATE OF CORRECTION

| | | |
|---|---|---|
| PATENT NO. | : 10,877,990 B2 | Page 1 of 1 |
| APPLICATION NO. | : 15/717344 | |
| DATED | : December 29, 2020 | |
| INVENTOR(S) | : Yin Tong | |

It is certified that error appears in the above-identified patent and that said Letters Patent is hereby corrected as shown below:

In the Specification

In Column 1, Line 3, please delete "REMOTE DATABASE SYNCHRONIZATION".

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*